United States Patent
Juh

(10) Patent No.: US 8,668,457 B2
(45) Date of Patent: Mar. 11, 2014

(54) GAS TURBINE ENGINE TRIM BALANCE

(75) Inventor: Christopher M. Juh, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 669 days.

(21) Appl. No.: 12/916,057

(22) Filed: Oct. 29, 2010

(65) Prior Publication Data

US 2012/0107095 A1  May 3, 2012

(51) Int. Cl.
*F01D 5/10* (2006.01)

(52) U.S. Cl.
USPC ............................................. 416/145

(58) Field of Classification Search
USPC .................... 415/119; 416/144, 145; 464/180
See application file for complete search history.

(56) References Cited

U.S. PATENT DOCUMENTS

| | | | | |
|---|---|---|---|---|
| 2,494,756 A * | 1/1950 | Gruetjen | ................. | 416/145 |
| 3,952,612 A | 4/1976 | Kurkowski et al. | | |
| 4,003,265 A * | 1/1977 | Craig et al. | ................. | 74/5 R |
| 4,059,972 A * | 11/1977 | Beam et al. | ................. | 464/23 |
| 4,159,888 A * | 7/1979 | Thompson | ................. | 415/105 |
| 4,177,692 A * | 12/1979 | Irwin | ................. | 464/180 |
| 4,306,834 A | 12/1981 | Lee et al. | | |
| 5,893,346 A | 4/1999 | Hosoya | | |
| 6,477,916 B2 | 11/2002 | Knorkowski et al. | | |
| 7,296,976 B2 * | 11/2007 | Roever et al. | ................. | 416/144 |
| 7,371,042 B2 | 5/2008 | Lee | | |
| 7,955,050 B1 * | 6/2011 | Wadensten | ................. | 415/202 |
| 2005/0265846 A1 | 12/2005 | Przytalski et al. | | |
| 2008/0072604 A1 | 3/2008 | Swanson et al. | | |
| 2009/0229559 A1 | 9/2009 | Smies et al. | | |
| 2010/0080689 A1 | 4/2010 | Lee et al. | | |

* cited by examiner

*Primary Examiner* — Edward Look
*Assistant Examiner* — Liam McDowell
(74) *Attorney, Agent, or Firm* — O'Shea Getz P.C.

(57) ABSTRACT

A trim balance for a gas turbine engine having a hollow rotatable rotor shaft includes an elongate support rod adapted for longitudinal accommodation within and mounting on an interior surface of the rotor shaft and one or more apertured balance weights supported on the support rod which extends through the weight apertures and a weight retainer for retaining the weights on the support rod.

20 Claims, 3 Drawing Sheets

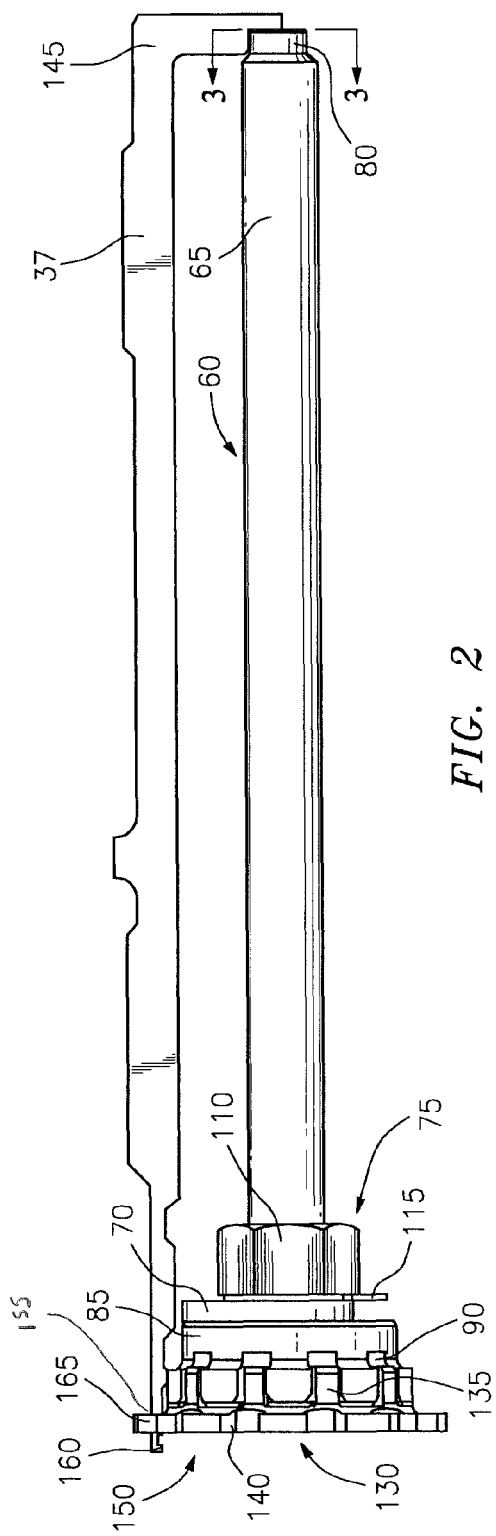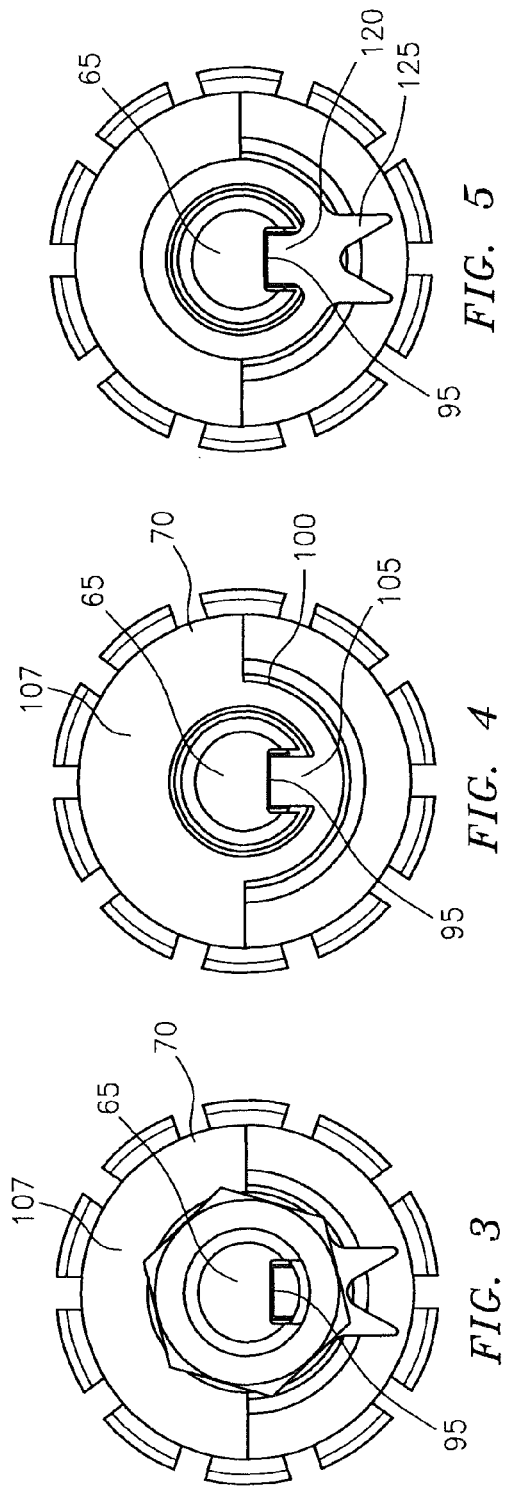

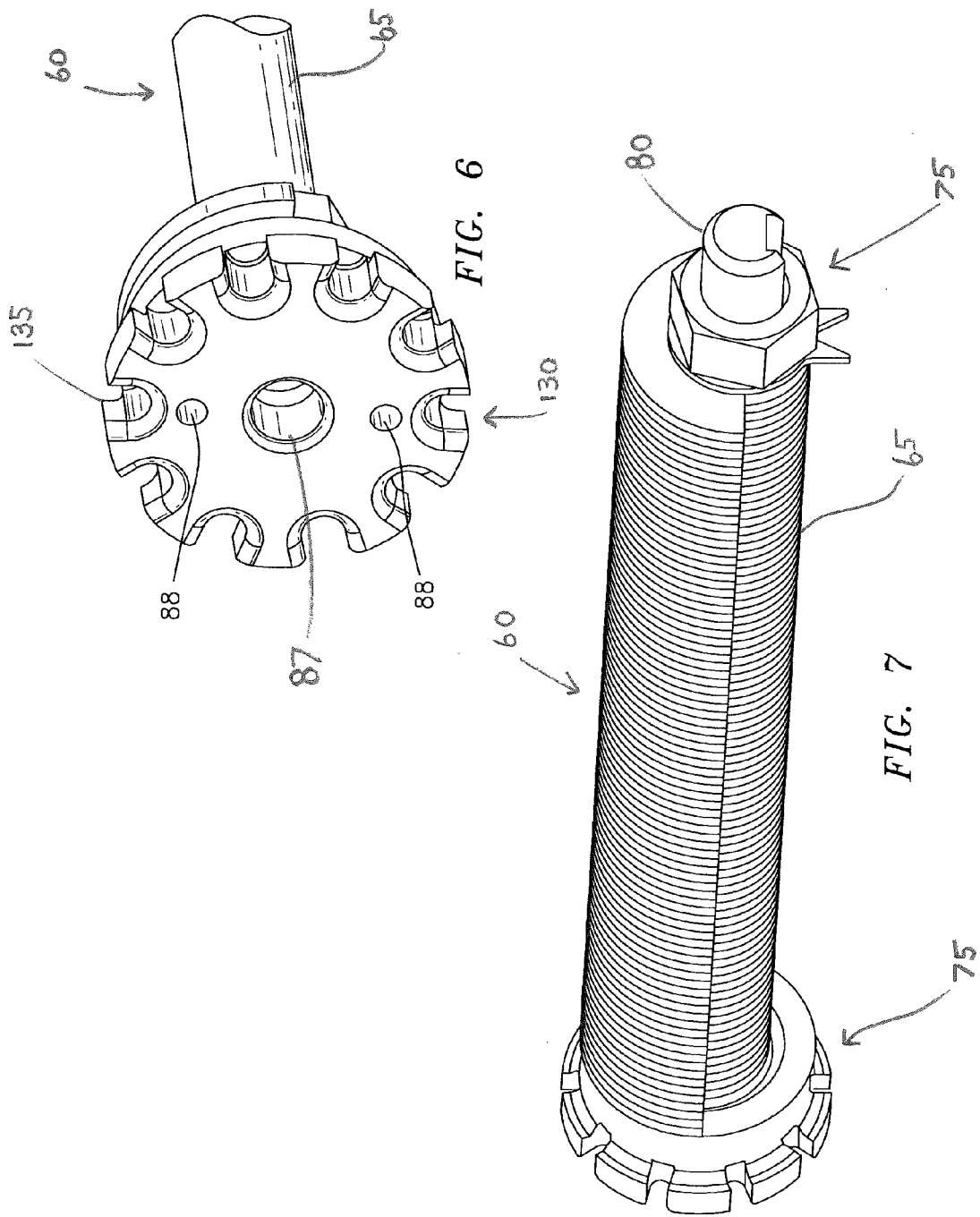

GAS TURBINE ENGINE TRIM BALANCE

BACKGROUND OF THE INVENTION

1. Technical Field

This invention relates generally to gas turbine engines and particularly to a device for balancing the rotors of such gas turbine engines.

2. Background Information

Gas turbine engines such as those which power aircraft and industrial equipment such as electrical generators, pumps and the like employ bladed rotors disposed within stators which include components such as vanes and seals. The stators are typically mounted within an outer case. It is a well-known practice to balance the engine rotors in the manufacture and assembly of the engines. Such rotor balancing minimizes the deleterious effects of rotor vibrations caused by imbalances in the rotors due to the normal tolerances in the manufacture of rotor components or anomalies in such manufacture.

It is also a well-known practice to balance the engine's rotors during the operational life of the engine. Such balancing during the operational life of the engine is necessary to correct imbalances in the engine's rotor due to normal rotor wear, bowing of the rotor, and erosion of the components thereof due to the ingestion of foreign matter during operation. Known methods of balancing a gas turbine engine rotor include the testing of the rotor to determine the location and magnitude of any imbalances, followed by the addition of weight to, or removal of weight from, the rotor at the location of the imbalance to remove the imbalance.

Typically, balancing a gas turbine engine rotor at, for example, a compressor section thereof is accomplished by adding weights to the rotor by attaching small weights to the rotor at compressor blade hubs or disks with clips or other mounting hardware, or removal of weight from the hubs or disks by grinding or similar material removal techniques. Access to the location on the engine's rotor where weight addition or removal is necessary to achieve balancing is typically through small ports located in the engine's case. However, such ports usually provide a very limited area for insertion and removal of tooling necessary to add weight or remove material from the rotor. Furthermore, accessing the rotor through such ports in the engine's case requires circumvention of components in the engine's stator by tooling required for weight addition or removal, and therefore addition or removal of weight from a gas turbine engine's rotor to achieve a balancing thereof requires removal of the rotor from the interior of the stator and case, as well as removal of various components of the engine's stator. Such engine teardowns associated with certain prior art balancing techniques and systems are costly and time consuming and can add significantly to the cost of and time required for balancing an engine's rotor in the manufacture and assembly thereof or the maintenance thereof in the field.

Accordingly, there is a need for a gas turbine engine rotor trim balance by which weight may be conveniently and efficiently added to or removed from a gas turbine engine rotor to achieve balancing thereof in the manufacture and the assembly thereof as well as in field maintenance thereof.

SUMMARY OF THE DISCLOSURE

In accordance with the present invention, a trim balance for a gas turbine engine having a hollow rotatable rotor shaft comprises an elongate support rod adapted for longitudinal accommodation within and mounting on an interior surface of the hollow rotor shaft and at least one balance weight supported on the support rod as well as a weight retainer disposed on the support rod for longitudinally retaining the weight on the support rod such that the weight is selectively mountable on and removable from the support rod. The trim balance is conveniently mounted on longitudinally spaced inner and outer mounts on the interior surface of the hollow rotor shaft so that the trim balance is accessible from an open end of the hollow rotor shaft for insertion of the trim balance within the hollow rotor shaft and removal therefrom for the addition of balance weights to the trim balance or removal of balance weights from the trim balance in an assembled engine without necessitating removal of the rotor from the engine's stator and case or other complex teardown procedures.

BRIEF DESCRIPTION OF THE DRAWINGS

FIG. 2 is a side elevation of the trim balance of the present invention installed in a hollow rotor shaft of a gas turbine engine;

FIG. 3 is an inner end view of the trim balance of the present invention taken in the direction of line 3-3 of FIG. 2;

FIG. 4 is an end of the trim balance of the present invention with a retaining nut and a lock washer employed to retain balance weights on the trim balance, removed;

FIG. 5 is an end view of a lock washer and balance weight employed in, and installed on the trim balance of the present invention;

FIG. 6 is an isometric view of an outer end of the trim balance of the present invention; and FIG. 7 is an isometric view of an inner end of the trim balance of the present invention.

DETAILED DESCRIPTION OF THE INVENTION

Figure 1:
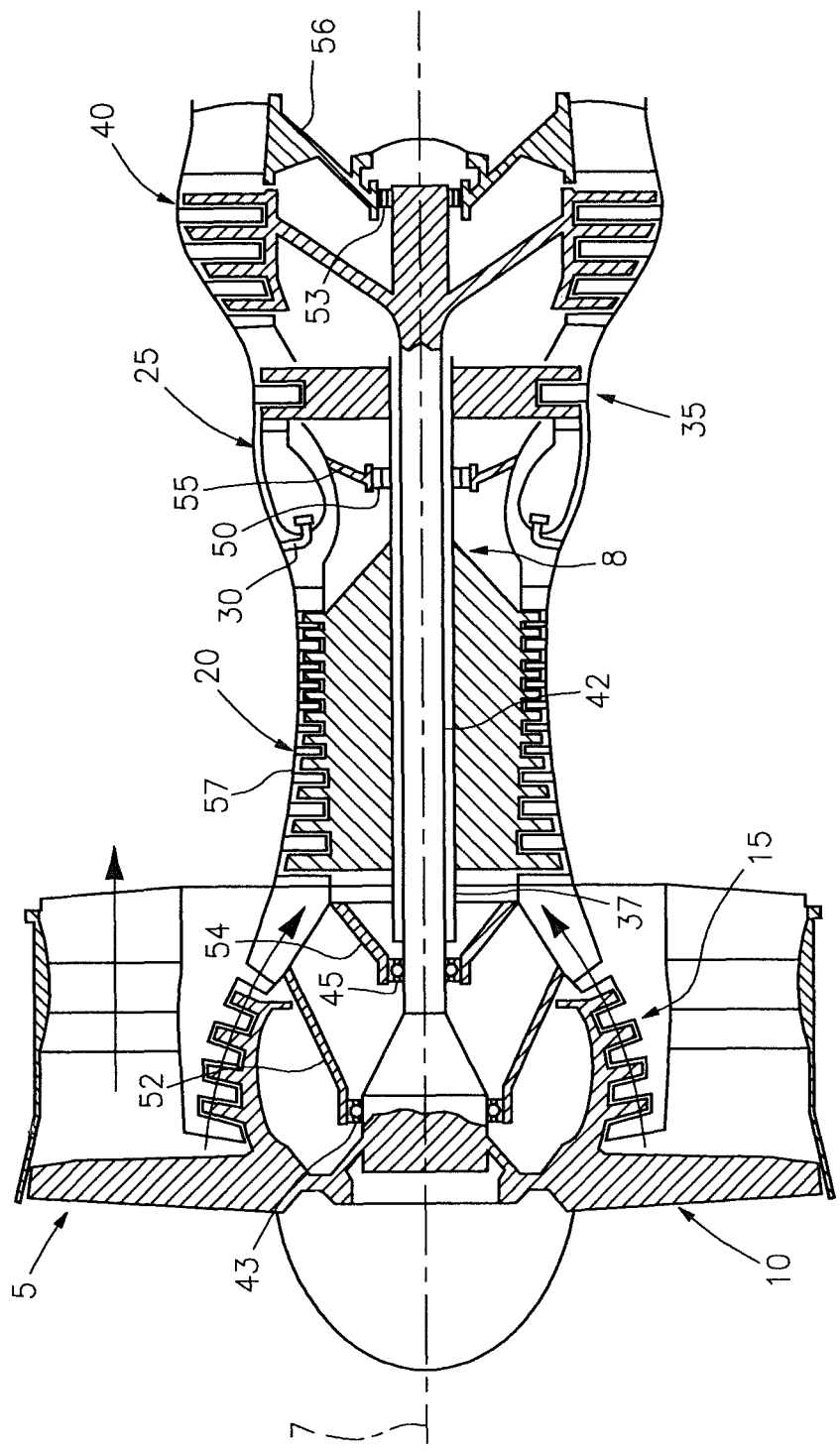
FIG. 1 is a schematic view of a turbofan gas turbine engine of the type employing the present invention.

Referring to FIG. 1, a turbofan gas turbine engine 5 has a longitudinal axis 7 about which the rotors 8 of the engine rotate. A fan 10 disposed at the engine inlet draws air into the engine. A low pressure compressor 15 located immediately downstream of fan 10 compresses air exhausted from fan 10 and a high pressure compressor 20 located immediately downstream of low pressure compressor 15, further compresses air received therefrom and exhausts such air to combustors 25 disposed immediately downstream of high pressure compressor 20. Combustors 25 receive fuel through fuel injectors 30 and ignite the fuel/air mixture. The burning fuel-air mixture (working medium fluid) flows axially to a high pressure turbine 35 which extracts energy from the working medium fluid and in so doing, rotates hollow shaft 37, thereby driving the rotor of high pressure compressor 20. The working medium fluid exiting the high pressure turbine 35 then enters low pressure turbine 40, which extracts further energy from the working medium fluid. The low pressure turbine rotor provides power to drive the fan 10 and low pressure compressor 15 via low pressure shaft 42, which is disposed interiorly of the hollow shaft 37, coaxial thereto. Working medium fluid exiting the low pressure turbine 40 provides axial thrust for powering an associated aircraft (not shown) or a free turbine (not shown). Alternatively, engine 5 may be constructed with a high pressure turbine and compressor shaft disposed within and concentric with a hollow low pressure turbine and compressor shaft.

Bearings 43, 45, 50 and 53 radially support the concentric high pressure and low pressure turbine shafts from separate frame structures 52, 54, 55 and 56 respectively, attached to engine case 57, which defines the outer boundary of the engine's stator which circumscribes rotors 8. However, it will be appreciated that the present invention is also well suited for mid-turbine frame engine architectures wherein the upstream bearings for the low and high pressure turbines are mounted on a common frame structure disposed longitudinally (axially) between the high and low pressure turbines.

Referring to FIGS. 2-7, a trim balance of the present invention is shown generally at 60 and comprises a threaded elongate support rod 65 adapted for longitudinal accommodation within and mounting on an interior surface of hollow rotor shaft 37, one or more generally asymmetrically annular weights 70 disposed on the support rod 65 and weight retainer 75 also disposed on the support rod 65 which longitudinally retains the weights on the support rod 65 for selective mounting on and removal from the support rod 65. Support rod 65 is threaded along the length thereof and includes a reduced diameter longitudinally inner end 80, a radially enlarged longitudinally outer end 85, having a threaded aperture 87 and a pair of unthreaded apertures 88 in an end surface thereof (FIG. 6) and a longitudinal elongate slot 95 in the lateral surface of the support rod 65.

As best seen in FIG. 4, the balance weights are apertured at a medial portion 100 thereof, the support rod 65 extending through the apertures to support the balance weights 70 thereon. Each balance weight 70 also includes tabs 105 extending radially into aperture 100 from an edge thereof, tab 105 being received within the longitudinal slot 95 in the support rod 65 to prevent any undesired rotation of the balance weight 70 on the support rod 65. The balance weights 70 also include enlarged portions 107 in alignment with one another for adjusting the balancing effect of the weights 70 in a manner to be more fully described hereinafter.

Balance weight retainer 75 comprises radially enlarged end portion 85 of rod 65 and a nut 110 threaded onto the rod 65 and compressively and longitudinally retains weights 70 on the rod 65, the tightening of the nut 110 causing the weights to bear against enlarged portion 85 of rod 65. Weight retainer 75 also includes a lock washer 115 disposed on the rod 65 between nut 110 and balance weights 70. The lock washer engages nut 110 to prevent unwanted rotation thereof on the support rod 65 and includes an inner tab 120 extending inwardly from an inner surface thereof, inner tab 120 being received within slot 95 in the support rod 65 to prevent rotation of the lock washer on the support rod 65. Lock washer 115 also includes at least one outer tab 125 extending radially outward from an outer edge thereof, outer tab 125 being bendable over the outer surface of nut 110 for preventing the nut from rotating on the support shaft relative to the lock washer.

Trim balance 60 also includes a vernier lock ring 130 provided with teeth 135 extending longitudinally from an inner surface thereof, teeth 135 being received within grooves 90 in radially enlarged end portion 85 of balance shaft 65.

Support rod 65 is mounted on longitudinally inner and outer mounts 145 and 150 respectively, provided on an inner surface of hollow rotor shaft 37. Inner mount 145 comprises an apertured flange extending radially inwardly from the inner surface of the hollow rotor shaft 37 and is apertured to receive reduced diameter inner end 80 of threaded rod 65. Outer mount 150 comprises a circumferential array of longitudinally extending castellations 155 (see, for example, FIG. 2) formed integrally with hollow rotor shaft 37 and disposed about the interior of a shaft. Outer mount 150 also includes a groove 160 in the inner surface of shaft 37, groove 160 accommodating a snap ring 165 which longitudinally retains support rod 65 in apertured flange 145 and retains slots 95 in enlarged end portion 85 of shaft 65 in engagement with castellations 155.

In use, the engine rotor is assembled without trim balance 60. The engine is then instrumented and tested at speed to determine the location and magnitude of any imbalances which may occur therein. Any imbalances occurring at the longitudinal location of the trim balance mounts may be conveniently and cost-effectively eliminated by installation of trim balance 60 through the outer open end of shaft 42 by engagement of tooling with aperture 87 in the outer end width or enlarged rod end 85 once vernier lock ring 130 is installed on radially enlarged end 85 of shaft 65. The trim balance may be angularly adjusted by rotation of balance shaft 65 on mounts 145 and 150 with the installation tooling to place the enlarged portions 107 of weights 70 to counteract any imbalances in the rotor. If weight is needed to be added or removed from the engine's rotor, trim balance 60 is removed from the shaft, an appropriate number of weights is added to or removed from trim balance 60 by removal of nut 110 and lock washer 115 from threaded rod 65 and placing the weights over the rod 65 and reengaging nut 110 and lock washer 115 with the rod 65 to compressively hold the weights between lock washer 115 and enlarged end portion 85 of rod 65. The trim balance is then reinserted into the open end of shaft 37 such that reduced diameter end portion 85 of rod 65 is received within the aperture in mounting flange 145. Vernier lock ring 130 is then inserted into the open end of shaft 37 such that teeth 135 are received within slots 95 in enlarged end portion 85 of shaft 65 and slots 140 are engaged within castellations 155. Teeth 135 are of sufficient strength and spaced sufficiently apart such that teeth 135 are accommodated within slots 140 for any relative angular orientation between castellations 155 and slots 140. Snap ring 165 is then inserted into circumferential groove 160 to securely lock the trim balance to the interior of rotor shaft 37.

While the invention hereof has been illustrated and described with respect to a particular embodiment wherein the particular components thereof have been described with respect to particular geometries thereof, it will be appreciated that various alternatives may suggest themselves to those skilled in the art. For example, while the balance weights have been shown and described with an asymmetrical semi-annular enlarged shape, it will be appreciated that weights of uniform annular shape or various other asymmetrical shapes may be employed. Similarly, it will be appreciated that various other part geometries may be employed without departing from the present invention. Also, while the trim balance of the present invention has been illustrated and described in conjunction with a hollow high pressure turbine-compressor shaft, the trim balance may be employed with axial utility in engine rotors employing hollow low pressure turbine-compressor shafts. Furthermore, the trim balance of the present invention may be employed at the longitudinal location of a gas turbine engine compressor, turbine or any other rotatable engine component which may require balancing in the manufacture or during the operational life thereof. It is intended by the appended claims to cover these and any other such modifications as may suggest themselves to those skilled in the art.

What is claimed is:

1. A trim balance for a gas turbine engine having a hollow rotatable rotor shaft, said trim balance comprising:

an elongate support rod adapted for longitudinal accommodation within, and mounting on, an interior surface of said hollow rotor shaft;

at least one balance weight supported on said support rod;

a weight retainer disposed on said support rod for retaining said weight thereon such that said weight is selectively mountable on, and removable from, said support rod;

wherein said elongate support rod is threaded and said weight retainer comprises a radially enlarged end portion of said support rod and a nut threaded on said rod, said balance weight being compressively retained on said rod between said nut and said enlarged support rod end portion;

wherein said enlarged end portion of said rod includes at least one aperture in a longitudinally outer end thereof for receiving tooling for the mounting of said trim balance on and removal of said trim balance from said hollow rotor shaft.

2. The trim balance of claim 1 wherein said balance weight is apertured at a medial portion thereof, said elongate support rod extending through said aperture.

3. The trim balance of claim 2 wherein said support rod includes an elongate longitudinal slot in the surface thereof and said balance weight includes a tab extending into said aperture in said balance weight from an edge thereof, said tab being received within said support rod longitudinal slot to prevent rotation of said balance weight on said support rod.

4. The trim balance of claim 2 wherein said balance weight is of asymmetrical annular shape and includes an enlarged generally semi-annular portion.

5. The trim balance of claim 4 and further including a lock washer disposed on said rod between said nut and said balance weight, said lock washer engaging said nut to prevent unwanted rotation thereof on said support rod.

6. The trim balance of claim 5 wherein said support rod includes an elongate longitudinal slot in the surface thereof, said lock washer including a tab extending inwardly from an inner surface thereof, said inner tab being received within said support rod slot to prevent rotation of said lock washer on said support rod, said lock washer including at least one outer tab extending outwardly from an outer edge of said lock washer, said outer tab being bendable over an outer surface of said nut for preventing said nut from rotating on said support rod relative to said lock washer.

7. The trim balance of claim 1 wherein said at least one aperture in said enlarged end portion of said support rod is threaded.

8. A gas turbine engine rotor including an open ended hollow rotor shaft, a trim balance received within said rotor shaft and mounted on the interior thereof said trim balance being accessible through an open end of said rotor shaft, and comprising:

an elongate support rod having a longitudinal axis parallel to the longitudinal axis of said rotor shaft;

at least one balance weight supported on said support rod; and a retainer mounted on said support rod for longitudinally retaining said weight on said support rod such that said weight is selectively mountable on and removable from said support rod when said support rod is removed from said rotor shaft;

wherein said enlarged end portion of said support rod includes at least one aperture in an outer end thereof for receiving tooling for the mounting of and removal of said trim balance from said rotor shaft.

9. The gas turbine engine rotor of claim 8 wherein said rotor shaft, at longitudinally spaced locations on an interior surface thereof is provided with longitudinally inner and outer mounts which engage said trim balance at the ends of said support rod.

10. The gas turbine engine rotor of claim 9 wherein said longitudinally inner mount comprises a radially inwardly extending flange having an aperture therein which receives a longitudinally inner end of said support rod.

11. The gas turbine engine rotor of claim 9 wherein said weight retainer comprises a radially enlarged longitudinally outer end portion of said support rod provided at a radially outer lateral surface thereof with a circumferential array of longitudinally extending slots, said rotor further including an annular vernier lock ring provided at a longitudinally inner end surface thereof with a plurality of longitudinally extending teeth, each received within a corresponding one of said slots in said lateral surface of said radially enlarged support rod end, said vernier lock ring including a plurality of slots in a radially outer edge thereof, said longitudinally outer support rod mount comprising a circumferential array of longitudinally extending castellations, each being received within a corresponding one of said slots in said radially outer edge of said vernier lock ring and further comprising an annular groove in the inner surface of said rotor shaft, longitudinally outwardly adjacent said castellations, said rotor further including a snap ring received within said annular rotor shaft groove for longitudinally retaining said vernier lock ring in engagement with said castellations.

12. The gas turbine engine rotor of claim 11 wherein said elongate support rod is threaded at an end, said weight retainer further includes a nut threaded on said rod, said balance weight being compressively retained on said rod between said nut and said enlarged rod end portion.

13. The gas turbine engine rotor of claim 8 wherein said balance weight is apertured at a medial portion thereof, said elongate support rod extending through said balance weight aperture.

14. The gas turbine engine rotor of claim 13 wherein said support rod includes an elongate longitudinal slot in the surface thereof and said balance weight includes a tab extending radially inwardly into said aperture from an edge thereof, said tab being received within said support rod longitudinal slot to prevent rotation of said balance weight on said support rod.

15. The gas turbine engine rotor of claim 8 wherein said at least one aperture in said enlarged end portion of said support rod is threaded.

16. The gas turbine engine rotor of claim 12 further including a lock washer disposed on said support rod between said nut and said balance weight, said lock washer engaging said nut to prevent unwanted rotation thereof on said support rod.

17. The gas turbine engine of claim 8 wherein said support rod includes an elongate longitudinal slot in the surface thereof, said lock washer including an inner tab extending inwardly from an inner surface thereof, said tab being received within said support rod slot to prevent rotation of said lock washer on said support rod, said lock washer further including at least one outer tab extending outwardly from an outer edge of said lock washer, said outer tab being bendable over an outer surface of said nut for preventing said nut from rotating on said support rod relative to said lock washer.

18. A trim balance for use with an axially-extending rotor shaft, the rotor shaft defining an axially-extending rotor shaft cavity, the trim balance comprising:

an axially-extending support rod adapted to be connected to the rotor shaft, and adapted to be accommodated at least partially within the rotor shaft cavity;

a balance weight adapted to be supported on the support rod; and a nut adapted to be threadably connected to the support rod for axially and compressively retaining the balance weight between the nut and a radially enlarged end portion of the support rod when the balance weight is supported on the support rod;

wherein the radially enlarged end portion of the support rod defines a tooling feature for receiving tooling for the mounting of the trim balance on, and removal of the trim balance from, the rotor shaft.

19. The trim balance of claim 18, wherein the tooling feature includes an aperture that extends axially into the radially enlarged end portion of the support rod.

20. The trim balance of claim 18, wherein the tooling feature includes a protrusion that extends from the radially enlarged end portion of the support rod.

* * * * *